United States Patent
Pfeil (10) Patent No.: US 12,288,156 B2
(45) Date of Patent: Apr. 29, 2025

(54) MACHINE LEARNING SYSTEM AND A METHOD, A COMPUTER PROGRAM AND A DEVICE FOR CREATING THE MACHINE LEARNING SYSTEM

(71) Applicant: Robert Bosch GmbH, Stuttgart (DE)

(72) Inventor: Thomas Pfeil, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 933 days.

(21) Appl. No.: 17/260,065

(22) PCT Filed: Aug. 13, 2019

(86) PCT No.: PCT/EP2019/071761
§ 371 (c)(1),
(2) Date: Jan. 13, 2021

(87) PCT Pub. No.: WO2020/064209
PCT Pub. Date: Apr. 2, 2020

(65) Prior Publication Data
US 2021/0279580 A1   Sep. 9, 2021

(30) Foreign Application Priority Data

Sep. 26, 2018   (DE) .......................... 102018216471.1
Nov. 29, 2018   (DE) .......................... 102018220608.2

(51) Int. Cl.
*G06N 3/08*   (2023.01)
*G06N 3/04*   (2023.01)

(52) U.S. Cl.
CPC ................. *G06N 3/08* (2013.01); *G06N 3/04* (2013.01)

(58) Field of Classification Search
CPC ............ G06N 3/08; G06N 3/04; G06N 3/048; G06N 3/008; G06N 3/044; G06N 3/045; G06N 3/063

See application file for complete search history.

(56) References Cited

U.S. PATENT DOCUMENTS

| 11,468,313 | B1 * | 10/2022 | Naumov ................ G06N 10/00 |
| 2017/0286830 | A1 * | 10/2017 | El-Yaniv ................ G06N 3/045 |
| 2019/0385050 | A1 * | 12/2019 | Wang ....................... G06N 3/08 |

FOREIGN PATENT DOCUMENTS

| CN | 108021819 A | 5/2018 |
| DE | 202017102235 U1 | 5/2017 |

(Continued)

OTHER PUBLICATIONS

Zhu et al., "Adaptive Layerwise Quantization for Deep Neural Network Compression", IEEE. Jul. 2018. (Year: 2018).*

(Continued)

*Primary Examiner* — Alan Chen
(74) *Attorney, Agent, or Firm* — NORTON ROSE FULBRIGHT US LLP (57) ABSTRACT

A machine learning system, in particular a deep neural network. The machine learning system includes a plurality of layers that are connected to one another. The layers each ascertain an output variable as a function of an input variable and at least one parameter that is stored in a memory. The parameters of those layers that are connected to a further, in particular preceding, layer are each stored in the memory using a higher resolution than the parameters of those layers that are connected to a plurality of further, in particular preceding, layers. In addition, A method, a computer program, and a device for creating the machine learning system, are described.

10 Claims, 4 Drawing Sheets

(56) References Cited

FOREIGN PATENT DOCUMENTS

| DE | 202018104373 U1 | 8/2018 |
| DE | 102017218889 A1 | 4/2019 |

OTHER PUBLICATIONS

Moons et al, "Minimum Energy Quantized Neural Networks", 51st Asilomar Conference on Signals, Systems and Computers (Year: 2017).*

International Search Report for PCT/EP2019/071761, Issued Nov. 14, 2019.

Hubara, Itay et al., "Quantized Neural Networks: Training Neural Networks With Low Precision Weights and Activations," Library of Cornell University, 2016, pp. 1-29. <https://arxiv.org/pdf/1609.07061.pdf> Downloaded Dec. 22, 2020.

Baskin, Chaim et al., "Streaming Architecture for Large-Scale Quantized Neural Networks on an FPGA-Based Dataflow Platform," Library of Cornell University, 2018, pp. 1-8. <https://arxiv.org/pdf/1708.00052.pdf> Downloaded Dec. 22, 2020.

Kaiming, He et al., "Deep Residual Learning for Image Recognition," Library of Cornell University, 2015, pp. 1-12. <https://arxiv.org/pdf/1512.03385.pdf> Downloaded Dec. 22, 2020.

Darryl, D Lin et al., "Fixed Point Quantization of Deep Convolutional Networks," Library of Cornell University, 2016, pp. 1-10. <https://arxiv.org/pdf/1511.06393.pdf> Downloaded Dec. 22, 2020.

Judd, et al.: "Stripes: Bit—Serial Deep Neural Network Computing", 49th Annual IEEE/ACM International Symposium on Microarchitecture (MICRO), Oct. 15-19, 2016, pp. 1-12, ISBN 978-1-5090-3508-3/16.

Sze, et al.: "Efficient Processing of Deep Neural Networks: A Tutorial and Survey", Proceedings of the IEEE; 105(12), (2017), pp. 2295-2329.-ISSN 0018-9219.

* cited by examiner

MACHINE LEARNING SYSTEM AND A METHOD, A COMPUTER PROGRAM AND A DEVICE FOR CREATING THE MACHINE LEARNING SYSTEM

FIELD

The present invention relates to a machine learning system that has at least parameters having a low resolution. In addition, the present invention relates to a method and a computer program, and to a device for creating the machine learning system.

BACKGROUND INFORMATION

German Patent Application No. DE 10 2017 218 889.8 describes an artificial intelligence module that is designed to process one or more input variables, using an internal processing chain, to form one or more output variables. The internal processing chain is defined by one or more parameters. A distribution module is provided that is designed to ascertain the parameters as a function of at least one statistical distribution.

It is possible to create quantized neural networks having extremely strong quantization, as described, for example, in Hubara, Itay, et al., "Quantized neural networks: Training neural networks with low precision weights and activations," *The Journal of Machine Learning Research*, 2017, vol. 18, no. 1, pp. 6869-6898.

SUMMARY

In a first aspect of the present invention, a machine learning system is provided that is particularly efficient with regard to memory and energy. In accordance with an example embodiment of the present invention, the machine learning system includes a plurality of layers that are connected to one another. Parameters and/or activations of those layers that are connected to a plurality of in particular preceding layers each have a lower resolution, in particular a larger quantization error, than the parameters and/or the activations of those layers that are connected to a further, in particular preceding, layer.

The resolution can characterize the number of different possible, in particular discrete, variables by which the parameters and/or the activations are respectively represented. In addition or alternatively, the resolution can characterize a deviation, or a degree of accuracy, of the variables, e.g., stored in a memory, from the originally ascertained variables of the parameters, for example by how many bits the variables are represented. In addition or alternatively, the resolution can characterize a difference between two smallest variables of the parameters and/or of the activations, or of the difference between two next possible, in particular discrete, variables of the parameters and/or of the activations. It is to be noted that, advantageously, both the parameters and the activations are stored in a memory, whereby via a reduction in their resolutions less memory space is required.

The layers can be connected with one or more preceding and/or following layers. A preceding layer is understood as the layer that ascertains its output variable temporally before the respective connected layer and provides its output variable to the respective connected layer as input variable. A following layer is understood as the layer that obtains, as input variable, the output variable of the respective connected layer.

"Connected at the input side" can be understood as meaning that an output variable of one of the layers, in particular of a preceding and/or of a following layer, is used as an input variable of the layer connected to this layer.

The example machine learning system of the first aspect of the present invention may have the advantage that, due to the reduced resolution of the stated parameters, these parameters can be stored in the memory particularly efficiently with low memory space requirement, without, surprisingly, impairing the performance of the machine learning system. In addition, due to the reduced resolution of the parameters and/or of the activations, the computing requirement of this machine learning system can be reduced, because, for example through a suitable exploitation of the computing architecture and of the lower resolution of the parameters, the parameters can be processed in parallel. A further advantage is that, due to the resulting resource-saving procedure, the machine learning system can be used both for stationary applications (e.g., in computing centers) and for mobile applications (e.g., mobile data processing installations or embedded systems). Such compressed machine learning systems are particularly suitable for processing measured data close to the sensor or in the sensor itself, whereby measured data can be compressed and transmitted in a more bandwidth-efficient manner.

The fact that the intentionally lower resolution, in particular stronger quantization, of those parameters and/or activations of the layers that are connected to a plurality of further layers does not worsen the performance, in particular the accuracy, of the results of the machine learning system is due to the fact that, due to the additional connections of further different layers, differently processed output variables are provided. As result, the layer that is connected to a plurality of layers obtains more information, and the input variables can as a result be represented in a better, or more completely described, state space. For this reason, these layers are more robust against disturbances, whereby the parameters and activations of this layer can for example be more strongly quantized without impairing the performance of the machine learning system. It is to be noted that everything relating to the resolutions of the parameters can also be applied to the activations.

In accordance with an example embodiment of the present invention, a number of bits by which the parameters are stored, in particular in a memory, or by which the activations are represented, characterizes the resolution. In addition, in accordance with an example embodiment of the present invention, in each case, the resolution of the parameters or of the activations of that layer that is connected to a plurality of layers immediately at the input side is smaller by at least more than one bit than the resolution of the parameters or of the activations of those layers that are connected to exactly one layer immediately at the input side.

An advantage of this is that through the use of fewer bits for storing the parameters a smaller memory is required, enabling a more compact construction of the machine learning system. Because the energy consumption for the storing and reading of the parameters and activations is proportional to the number of bits, and for multiplications is quadratic to the resolution (in bits) of the parameters and activations, a reduction of the number of bits, in particular via a quantization, is particularly efficient with regard to computer resources.

In addition, in accordance with an example embodiment of the present invention, the parameters of those layers that are connected to a further layer each have a variable from a first list of possible, in particular discrete, variables, and the parameters of those layers that are connected to a plurality of further layers each have a variable from a second list of possible, in particular discrete, variables.

For example, the variables of the lists can be determined by ascertaining cluster centers of the parameters, which can then be used to store the parameters efficiently in the memory on the basis of the in particular discrete cluster centers. The advantage of the lists is that the lists each have for example the ascertained cluster centers, whereby, through comparison of the variables of the parameters with the variables of the lists, suitable variables can be assigned to the parameters, and the parameters can have a lower resolution based on the lower number of different possible variables of the parameters. It is to be noted that, alternatively or in addition, the lists may include rounded values of the ascertained parameters or of the ascertained cluster centers. Alternatively, the lists can be ascertained separately for each layer.

In addition, in accordance with an example embodiment of the present invention, the first list contain more entries than the second list. It is possible that the variables of the lists are quantized variables, such that here values of the second list are more strongly quantized, i.e., in particular have fewer quantization stages than the values of the first list. In addition, it is proposed that the resolution of the parameters and/or activations be a function of a number of layers connected immediately at the input side.

It is to be noted that the machine learning system can be realized both exclusively in hardware and also in software, or in a mixed form of software and hardware, whereby in each case less memory has to be provided for storing the parameters, for which reason the machine learning system according to the first aspect of the present invention can also be installed and used in the smallest technical systems.

In addition, it is to be noted that each of the layers can be connected respectively to at least two additional layers of the plurality of layers at the input side, and in particular each layer has a skip connection. A machine learning system having these layers can, corresponding to the above-named embodiments of the first aspect of the present invention, have a lower resolution, in particular a stronger quantization, than an equivalent machine learning system in which these layers are connected only to one further layer at the input side.

In a second aspect of the present invention, an in particular computer-implemented method is provided for creating the machine learning system according to the first aspect. Inter alia, in accordance with an example embodiment of the present invention, the method includes the following steps: in the first step, training data are provided that include input variables and output variables assigned to the input variables. The machine learning system is then trained. During the training of the machine learning system, the parameters are adapted in such a way that, as a function of the input variables of the training data, the machine learning system ascertains their respectively assigned output variables. Subsequently, the resolution of the parameters is reduced. Here, in each case the resolution of the parameters of those layers that are connected to a plurality of further layers is more strongly reduced than the resolution of the parameters of those layers that are connected to one further layer.

Preferably, a compressed machine learning system is structurally identical to a provided machine learning system, for which reason "corresponding resolution of parameters or activations" can be understood as meaning that the parameters or activations can be found at the same position of the respective other machine learning system having the corresponding resolution.

In addition, in accordance with an example embodiment of the present invention, during the reduction of the resolution of the parameters, at least two lists are provided each having possible variables of the parameters. The variables of the list can in each case be ascertained by a quantization or by a clustering or by a rounding of the variables of the modified parameters during training. The parameters of those layers whose input variable is the output variable of one of the further layers are each assigned a variable from a first list of possible, in particular discrete, variables, and a variable from a second list of possible, in particular discrete, variables is assigned to each of the parameters of that layer whose input variable is the plurality of the output variables of further layers.

In addition, in accordance with an example embodiment of the present invention, the training is carried out as a function of a cost function, the cost function having an additional term that provides a penalizing of the variables of the parameters if these are unequal to a possible quantized variable of the parameters.

In addition, in accordance with an example embodiment of the present invention, the machine learning system produced according to the second aspect of the present invention ascertains an output variable as a function of an acquired sensor variable of a sensor, this output variable then being used for the ascertaining of a control variable by a control unit.

In accordance with an example embodiment of the present invention, the control variable can be used to control an actuator of a technical system. The technical system can for example be an at least partly autonomous machine, an at least partly autonomous vehicle, a robot, a tool, a machine tool, or a flying object such as a drone. The input variable can for example be ascertained as a function of acquired sensor data and provided to the machine learning system. The sensor data can be acquired by a sensor, such as a camera, of the technical system, or alternatively can be received from an external source.

In a further exemplary embodiment of the present invention, the machine learning system is set up to classify the sensor data.

In a further aspect of the present invention, a computer program is provided. The computer program is set up to carry out one of the above-named methods of the second aspect of the present invention. The computer program includes instructions that cause a computer to carry out one of these named methods with all its steps when the computer program runs on the computer. In addition, a machine-readable storage module is proposed on which the computer program is stored. In addition, in accordance with an example embodiment of the present invention, a device is provided that is set up to carry out one of the methods of the second aspect.

Exemplary embodiments of the aspects named above are presented in the figures and are explained in more detail below.

DETAILED DESCRIPTION OF EXAMPLE EMBODIMENTS

Figure 1:
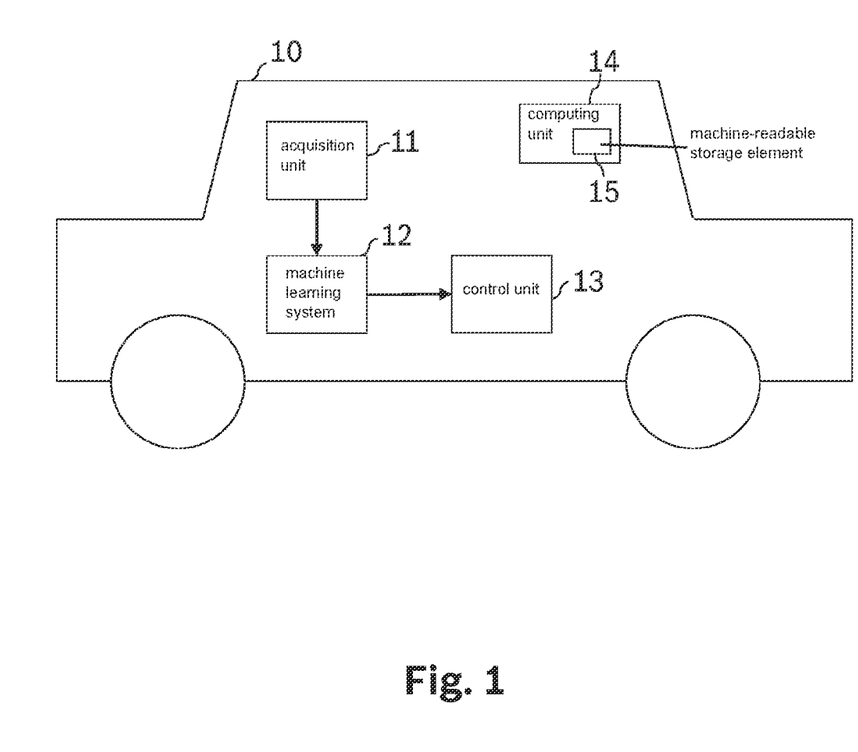
FIG. 1 shows a schematic representation of a vehicle, in accordance with an example embodiment of the present invention.

FIG. 1 shows a schematic representation of an at least partly autonomous robot that, in a first exemplary embodiment of the present invention, is an at least partly autonomous vehicle (10). In a further exemplary embodiment, the at least partly autonomous robot can be a service robot, assembly robot, or stationary production robot, or alternatively an autonomous flying object such as a drone.

The at least partly autonomous vehicle (10) can include an acquisition unit (11). The acquisition unit (11) can be for example a camera that acquires a surrounding environment of the vehicle (10). The acquisition unit (11) can be connected to a machine learning system (12). The machine learning system (12) ascertains a output variable as a function of a provided input variable, e.g., provided by the acquisition unit (11), and as a function of a plurality of parameters of the machine learning system (12). The output variable can be forwarded to a control unit (13).

As a function of the output variable of the machine learning system (12), the control unit (13) controls an actuator, preferably in such a way that the vehicle (10) carries out a collision-free maneuver. In the first exemplary embodiment, the actuator can be an engine or a brake system of the vehicle (10).

In a further exemplary embodiment, the partly autonomous robot can be a tool, a machine tool, or a production robot. A material of a workpiece can be classified by the machine learning system (12). The actuator here can be for example a motor that drives a grinding head.

In addition, the vehicle (10), in particular the partly autonomous robot, includes a computing unit (14) and a machine-readable storage element (15). On the storage element (15), a computer program can be stored that includes commands that, when the commands are executed on the computing unit (14), have the result that the machine learning system (12) is operated by the computing unit (14).

In a further exemplary embodiment of the partly autonomous robot, the control unit (13) includes a release system. The release system decides whether an object, e.g., an acquired robot or an acquired person, has access to an area, as a function of the output variable of the machine learning system (12). Preferably, the actuator, for example a door-opening mechanism, is controlled by the control unit (13).

In an alternative exemplary embodiment of the present invention, the machine learning system (12), which is connected to the acquisition unit (11) as in the first exemplary embodiment, is used for a building control system. A user behavior is acquired by a sensor, for example a camera or a movement detector, and the control unit for example controls a heat pump of a heating system as a function of the output variable of the machine learning system (12). The machine learning system (12) can then be set up to ascertain, on the basis of the acquired user behavior, which operating mode of the building control system is desired.

In a further specific embodiment of the present invention, the machine learning system (12) is used in a measurement system that is not shown in the Figures. The measurement system differs from the vehicle (10) according to FIG. 1 in that the measurement system does not include a control unit (13). The measurement system can store or represent the output variable of the first machine learning system (12), for example using visual or auditory representations, instead of forwarding it to the control unit (13).

It is also possible that, in a further development of the measurement system, the acquisition unit (11) acquires an image of a human or animal body or a part thereof. For example, this can take place using an optical signal, an ultrasonic signal, or an MRT/CT method. In this further development, the measurement system can include the machine learning system (12), which is trained so as to output a classification as a function of the input variable, e.g., as to which disease state may be present on the basis of this input variable.

In a further exemplary embodiment, the machine learning system (12) can be integrated in a sensor, or in the acquisition unit (11), in order to process the acquired sensor values using the machine learning system (12). The processed sensor values, by the machine learning system (12), are preferably compressed or already-evaluated sensor values, so that these values can subsequently be efficiently transmitted to, for example, the control unit (13). Preferably, here at least the parameters are stored on a chip of the sensor, or the machine learning system is integrated in hardware on the chip.

Figure 2:
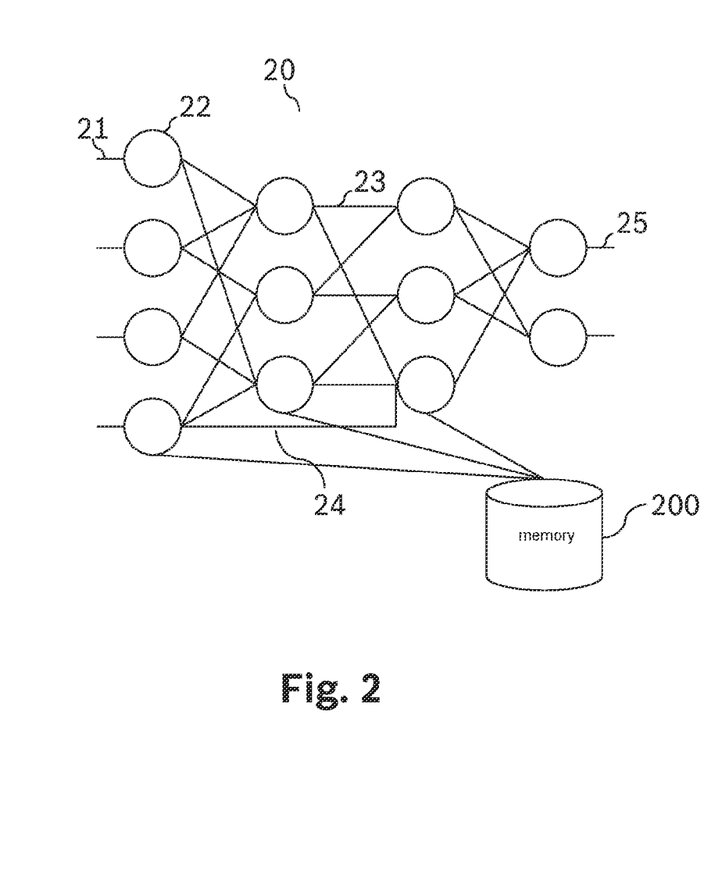
FIG. 2 shows a schematic representation of a deep neural network having a flip connection and a memory, in accordance with an example embodiment of the present invention.

FIG. 2 shows a schematic representation of the machine learning system (12), which in this exemplary embodiment is a deep neural network (20). In other specific embodiments, the machine learning system (12) may be a convolutional neural network or a recurrent neural network.

The deep neural network (20) includes a plurality of layers that are connected to one another by connections (23) and that each include a plurality of neurons (22). In addition, the deep neural network (20) has a skip connection (24). The skip connection (24) in FIG. 2 has the effect that an output variable of the first layer of the deep neural network (20) is forwarded directly to the third layer, and is provided here as input variable. In this way, the second layer is skipped. It is to be noted that the skip connection (24) can also be realized in the opposite direction. For example, an output variable of the third layer can be supplied as input variable to a preceding layer, by a recurrent skip connection.

The deep neural network (20) ascertains an output variable (25) layer-by-layer, as a function of an input variable (21) of the deep neural network (20). For this purpose, each layer ascertains an output variable as a function of the input variable provided to it and as a function of the parameters of this layer. The output variable is then forwarded to the further layers through the connections (23).

In this exemplary embodiment of the present invention, the parameters of the respective layers can for example each have at least one first variable or/and a second variable and a third variable. The layers can each weight the input variable using the first variable or/and filter it using the second variable. The layers can add the third variable to the weighted/filtered input variable. Optionally, this processed input variable is further processed as a function of the parameter, using an activation function (e.g., ReLU). Optionally, the layer can also include a batch normalization layer.

The particular feature of the neural network (20) is that the parameters of the layer that receives the output variable of the first layer as input variable via the skip connection (24) are stored in at least one memory (200) with a lower resolution than the parameters of the other layers that do not have a skip connection. For example, the parameters of the third layer are stored in the memory (200) using 5 bits, and the parameters of the further layers are stored in the memory (200) using at least 8 bits. It is to be noted that, due to the reduced resolution of the parameters, the activations can likewise be represented in a reduced resolution, e.g., 5 bits. It is also possible for only the activations of the third layer to have a reduced resolution, e.g., 5 bits, the activations of the further layers not having a skip connection, and for all parameters of the neural network (20) to have the same resolution (e.g., 8 bits).

Figure 3:
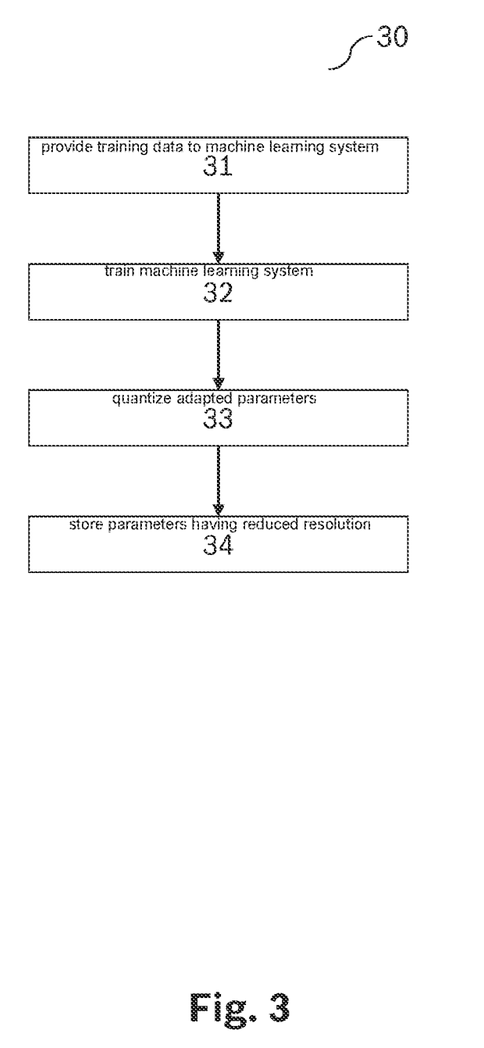
FIG. 3 shows a schematic representation of a specific embodiment of the method for producing a machine learning system having compressed parameters, in accordance with the present invention.

FIG. 3 shows a schematic representation of a method (30) for creating the machine learning system (12).

The method begins with step 31. In this step, training data are provided to the machine learning system (12). The training data preferably include training input variables and respectively assigned training output variables (labels). The training input variables can be for example images from a camera, and the training output variables can be for example a classification or segmenting of the camera images. In addition or alternatively, the training data can include a plurality of labeled tone sequences, text segments, radar signals, lidar signals, or ultrasonic signals.

In the following step 32, the machine learning system (12) is trained. During the training of the machine learning system (12), the parameters of the respective layers of the machine learning system (12) are adapted in such a way that the machine learning system ascertains the respectively assigned output variables as a function of the provided training input variables.

Preferably, the training is carried out as a function of a cost function that for example characterizes a difference between the ascertained output variables (25) and the training output variables. The cost function can be optimized with regard to the parameters using a gradient descent method. In the gradient descent method, the cost function is iteratively optimized, a gradient having a resolution of 32 bits standardly being used. The parameters can be adapted as a function of the gradient, causing the cost function to change, so that this function is ideally minimized or maximized. Because the gradient standardly has a resolution of 32 bits, the adapted parameters are stored in the memory (200), as a function of the gradient, preferably with a resolution of 32 bits.

After the training has been carried out in step 32, there follows step 33. In step 33, the adapted parameters, which each have a resolution of 32 bits, are quantized. In addition, for the quantization of the parameters the resolution of the activations can be reduced, preferably relative to the quantization of the respective layers.

The quantization of the parameters can be carried out using a linear quantization, but also using a non-linear quantization, for example a logarithmic quantization. In addition to the named deterministic quantizations, stochastic quantizations are also possible; on this, see the documents named above.

The quantization can for example be carried out in such a way that all layers have the same quantization, preferably a quantization with 8 bits. Following this, those parameters of the layers connected to a plurality of further layers can be intentionally more strongly quantized, preferably with 5 bits. Alternatively, for the parameters of those layers that are connected to only one further layer, different quantizations can be used in each case, preferably quantizations having more than 8 bits, in particular 8 to 12 bits. It is also possible for those layers that are connected to a plurality of further layers to each have different quantizations, preferably quantizations having fewer than 8 bits, in particular 4 to 7 bits.

After the resolution of the parameters has been reduced, in step 34 the parameters having reduced resolution are stored in the memory (200).

The method (30) terminates therewith. It is to be noted that steps 32 to 34 can be cyclically repeated multiple times one after the other until a specifiable termination criterion has been met. Optionally, given the use of a plurality of batches of training data, after the termination of step 34 the machine learning system can be trained anew, using the newly stored parameters, for example for a further batch, beginning with step 32.

In a further exemplary embodiment, after step 32, in addition or alternatively a reduction of the resolutions, i.e., a quantization, of the parameters and/or of the activations of the layers can be carried out as a function of whether a skip connection is present or not. For the case in which the machine learning system (12) has at least one skip connection, the resolutions are chosen smaller than for the case in which there is no skip connection. In addition or alternatively, from a multiplicity of different methods for reducing the resolution, each having different properties with regard to accuracy and/or computing expense, a suitable method can be selected as a function of the presence of the skip connection. For example, a logarithmic quantization method can be selected if no skip connection is present, and a simpler, e.g., linear, quantization method can be selected if a skip connection is present. Advantageously, the parameters and the activations are quantized using the same quantization resolution, in particular the layers after the input layer, which receives the input variable.

Figure 4:
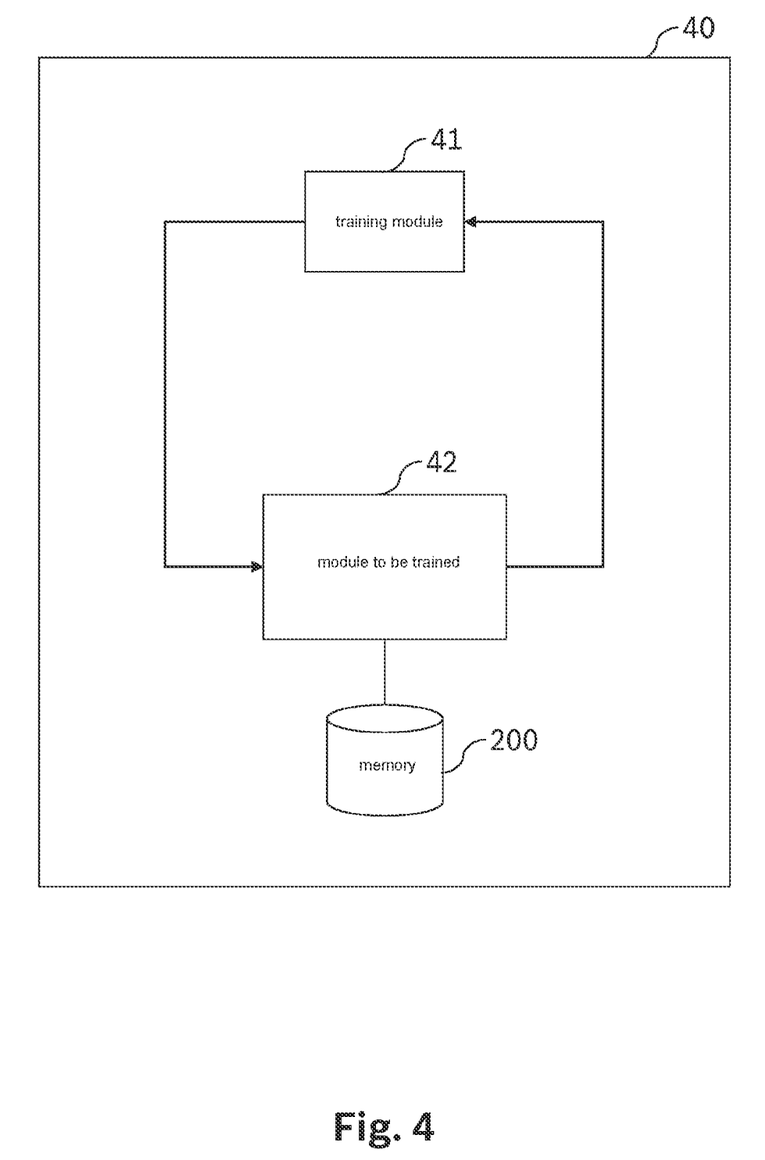
FIG. 4 shows a schematic representation of a specific embodiment of a device that can be used to train the machine learning system, in accordance with the present invention.

FIG. 4 shows a schematic representation of an example device (40) for creating the machine learning system (12), in particular for carrying out steps 31 to 34 for creating the machine learning system (12). The device (40) includes a training module (41) and a module (42) that is to be trained. This module (42) to be trained contains the machine learning system (12). The device (40) for training the machine learning system (12) trains the machine learning system (12) as a function of output variables of the machine learning system (12), and preferably using specifiable training data. During the training, parameters of the machine learning system (12) that are stored in the memory (200) are adapted.

What is claimed is:

1. A machine learning system, comprising:
 a plurality of layers that are each connected at an input side to at least one further layer of the plurality of layers, each of the layers being configured to ascertain an output variable as a function of activations, each respective layer of the layers further configured to ascertain the activations as a function of at least one input variable of the respective layer and as a function of parameters that are assigned to the respective layer;
 wherein a resolution of the parameters or of the activations is a function of whether or not one of the layers is connected immediately at the input side to a plurality of preceding layers, wherein a resolution of the parameters or of the activations of a layer connected immediately at the input side to the plurality of preceding layers is lower than a resolution of the parameters or of the activations of those layers that are immediately connected at the input side to only one layer, wherein a number of bits, by way of which the parameters are stored in particular in a memory, characterizes the resolution, wherein in each case the resolution of the parameters of that layer that is connected to a plurality of layers immediately at the input side is smaller by at least more than one bit than the resolution of the parameters of those layers that are connected to only one layer immediately at the input side, wherein the machine learning system comprises an input layer and an output layer which outputs an output variable, wherein the input layer receives a sensor variable of a sensor, and the output layer being either connected to a control unit and the control unit ascertaining as a function of the output variable a control variable for controlling the physical actuator or the output variable classifying the sensor variable.

2. The machine learning system as recited in claim 1, wherein the machine learning system is a deep neural network.

3. The machine learning system as recited in claim 1, wherein the parameters or activations of those layers that are connected immediately at the input side to only one layer each have a variable from a first list including a first specifiable number of quantized variables, and the parameters or activations of that layer that is immediately connected at the input side to a plurality of layers each have a variable from a second list including a second specifiable number of quantized variables, a quantization error of the variables of the first list being smaller than the quantization error of the variables of the second list.

4. The machine learning system as recited in claim 1, wherein an input variable of the input layer of the machine learning system is a function of the sensor variable of the sensor, and an output layer of the machine learning system is connected to a control unit, the control unit ascertaining, as a function of the output variable of the output layer connected to the control unit, a control variable for controlling a physical actuator.

5. The machine learning system as recited in claim 4, wherein an at least partly autonomous robot and/or a production system and/or a personal assistant and/or an access system and/or a monitoring system and/or a medical imaging system, is controlled as a function of the ascertained control variable.

6. A method for creating a compressed machine learning system from a machine learning system, the created compressed machine learning system, which is a deep neural network, comprising a plurality of layers, which in each case are connected on the input side to at least one further layer of the plurality of layers, the layers in each case being set up to ascertain an output variable as a function of activations, the layers further in each case being set up to ascertain the activations as a function of at least one input variable of the respective layer and as a function of parameters that are associated with the respective layer, a resolution of the parameters being a function of whether or not one of the layers is immediately connected on the input side to a plurality of layers, a number of bits, by way of which the parameters are stored in particular in a memory, characterizing the resolution, in each case the resolution of the parameters of that layer that is connected to a plurality of layers immediately at the input side being smaller by at least more than one bit than the resolution of the parameters of those layers that are connected to only one layer immediately at the input side, the machine learning system comprising an input layer and an output layer which outputs an output variable, the input layer receiving a sensor variable of a sensor, and the output layer being either connected to a control unit and the control unit ascertaining as a function of the output variable a control variable for controlling a physical actuator or the output variable classifying the sensor variable, the method comprising the following steps:

providing the machine learning system having a plurality of layers each having an input side; and selecting a resolution of parameters or activations of the compressed machine learning system by reducing a corresponding resolution of parameters or activations of the machine learning system, the resolution of the parameters or of the activations of the compressed machine learning system being selected as a function of whether or not one of the layers of the machine learning system is connected immediately at the input side to a multitude of the layers, wherein the corresponding resolution of the parameters or of the activations of a layer the plurality of layers of the machine learning system that is connected immediately at the input side to the multitude of layers is more strongly reduced than a corresponding resolution of the parameters or of the activations of those layers of the machine learning system that are connected immediately at the input side to only one layer, wherein the reduction of the resolution is carried out by reducing a number of bits for representing variables.

7. The method as recited in claim 6, wherein the reduction of the number of bits is carried out as a function of a number of quantization steps.

8. The method as recited in claim 6, further comprising:
providing training data that respectively include input variables and output variables assigned to the input variables; and training the machine learning system, the parameters being adapted during the training in such a way that, as a respective function of the input variables of the training data, the machine learning system respectively ascertains the assigned output variables of the input variables.

9. A non-transitory machine-readable storage medium on which is stored a computer program for creating a compressed machine learning system from a machine learning system, the created compressed machine learning system, which is a deep neural network, comprising a plurality of layers, which in each case are connected on the input side to at least one further layer of the plurality of layers, the layers in each case being set up to ascertain an output variable as a function of activations, the layers further in each case being set up to ascertain the activations as a function of at least one input variable of the respective layer and as a function of parameters that are associated with the respective layer, a resolution of the parameters being a function of whether or not one of the layers is immediately connected on the input side to a plurality of layers, a number of bits, by way of which the parameters are stored in particular in a memory, characterizing the resolution, in each case the resolution of the parameters of that layer that is connected to a plurality of layers immediately at the input side being smaller by at least more than one bit than the resolution of the parameters of those layers that are connected to only one layer immediately at the input side, the machine learning system comprising an input layer and an output layer which outputs an output variable, the input layer receiving a sensor variable of a sensor, and the output layer being either connected to a control unit and the control unit ascertaining as a function of the output variable a control variable for controlling a physical actuator or the output variable classifying the sensor variable, the computer program, when executed by a computer, causing the computer to perform the following steps:
  providing the machine learning system having a plurality of layers each having an input side; and
  selecting a resolution of parameters or activations of the compressed machine learning system by reducing a corresponding resolution of parameters or activations of the machine learning system, the resolution of the parameters or of the activations of the compressed machine learning system being selected as a function of whether or not one of the layers of the machine learning system is connected immediately at the input side to a multitude of the layers, wherein the corresponding resolution of the parameters or of the activations of a layer the plurality of layers of the machine learning system that is connected immediately at the input side to the multitude of layers is more strongly reduced than a corresponding resolution of the parameters or of the activations of those layers of the machine learning system that are connected immediately at the input side to only one layer, wherein the reduction of the resolution is carried out by reducing a number of bits for representing variables.

10. A device configured to create a compressed machine learning system from a machine learning system, the created compressed machine learning system, which is a deep neural network, comprising a plurality of layers, which in each case are connected on the input side to at least one further layer of the plurality of layers, the layers in each case being set up to ascertain an output variable as a function of activations, the layers further in each case being set up to ascertain the activations as a function of at least one input variable of the respective layer and as a function of parameters that are associated with the respective layer, a resolution of the parameters being a function of whether or not one of the layers is immediately connected on the input side to a plurality of layers, a number of bits, by way of which the parameters are stored in particular in a memory, characterizing the resolution, in each case the resolution of the parameters of that layer that is connected to a plurality of layers immediately at the input side being smaller by at least more than one bit than the resolution of the parameters of those layers that are connected to only one layer immediately at the input side, the machine learning system comprising an input layer and an output layer which outputs an output variable, the input layer receiving a sensor variable of a sensor, and the output layer being either connected to a control unit and the control unit ascertaining as a function of the output variable a control variable for controlling a physical actuator or the output variable classifying the sensor variable, the device configured to:
  provide the machine learning system having a plurality of layers each having an input side; and
  select a resolution of parameters or activations of the compressed machine learning system by reducing a corresponding resolution of parameters or activations of the machine learning system, the resolution of the parameters or of the activations of the compressed machine learning system being selected as a function of whether or not one of the layers of the machine learning system is connected immediately at the input side to a multitude of the layers, wherein the corresponding resolution of the parameters or of the activations of a layer the plurality of layers of the machine learning system that is connected immediately at the input side to the multitude of layers is more strongly reduced than a corresponding resolution of the parameters or of the activations of those layers of the machine learning system that are connected immediately at the input side to only one layer, wherein the reduction of the resolution is carried out by reducing a number of bits for representing variables.

* * * * *